United States Patent [19]

Pfau et al.

[11] Patent Number: 6,033,024
[45] Date of Patent: Mar. 7, 2000

[54] SEAT, ESPECIALLY VEHICLE SEAT

[76] Inventors: Karl-Heinz Pfau, AM Höhneck 10, D-72275 Alpirsbach; Edgar Franke, Grabenstrasse 14, D-97816 Lohr a.M., both of Germany

[21] Appl. No.: 09/180,264

[22] PCT Filed: May 6, 1997

[86] PCT No.: PCT/EP97/02293

§ 371 Date: Nov. 6, 1998

§ 102(e) Date: Nov. 6, 1998

[87] PCT Pub. No.: WO97/43143

PCT Pub. Date: Nov. 20, 1997

[30] Foreign Application Priority Data

May 9, 1996 [DE] Germany .......................... 296 08 362

[51] Int. Cl.[7] ..................................................... A47C 7/20
[52] U.S. Cl. ................................ 297/452.26; 297/284.9; 297/452.35
[58] Field of Search ........................... 297/284.9, 452.23, 297/452.26, 452.34, 452.35, 452.36

[56] References Cited

U.S. PATENT DOCUMENTS

| 3,259,435 | 7/1966 | Jordon, Jr. . | |
| 3,797,886 | 3/1974 | Griffiths | 297/452.23 |
| 4,124,248 | 11/1978 | Mayer | 297/284.9 X |
| 4,337,931 | 7/1982 | Mundell et al. | 297/452.26 X |
| 4,500,136 | 2/1985 | Murphy et al. | 297/284.9 |
| 4,938,529 | 7/1990 | Fourrey . | |
| 5,022,709 | 6/1991 | Marchino . | |
| 5,213,392 | 5/1993 | Bostrom et al. . | |
| 5,425,569 | 6/1995 | Hayes | 297/452.34 X |

FOREIGN PATENT DOCUMENTS

| 2 691 114 | 11/1993 | France . |
| 4-325330 | 3/1993 | Japan . |

*Primary Examiner*—Peter R. Brown
*Attorney, Agent, or Firm*—Cantor Colburn LLP

[57] ABSTRACT

A seat has a seating surface with upholstery and side cushions supporting the user laterally. The seat has a frame stabilizing it that goes into the side cushions with its side parts. An additional reinforcing element reinforcing the middle part of the transverse part can be attached to at least one transverse part connecting the side parts of the frame by means of at least two connectors that can move along the transverse part.

5 Claims, 2 Drawing Sheets

SEAT, ESPECIALLY VEHICLE SEAT

TECHNICAL FIELD

The invention concerns a seat, especially a motor vehicle seat

STATE OF THE ART

Today most of these types of motor vehicle seats, as known from U.S. Pat. No. 4,938,529 for example, have a frame stabilizing the seating area, preferably in the form of a steel band frame. This steel band frame has foamed-in upholstery. The upholstery in turn has side cushions that serve to support the vehicle passengers on the side as well. But driving around curves or lateral shocks produce very high lateral stresses on the side cushions, and they can be deformed, since the resilience of the frame is not effective enough.

DESCRIPTION OF INVENTION

Starting from the state of the art, this invention is based on the problem of developing a seat of the type mentioned above that can take these lateral stresses too.

This problem is solved by a seat with the features in claim 1.

A reinforcing element can be applied for this purpose to the transverse parts of the frame that connect the side parts and connect the side cushions to one another. This reinforcing element is attached by connectors whose distance apart can change, so that depending on the distance between the connectors, the resilience can be adjusted to the corresponding requirements, so that the vehicle seat remains in its desired original form.

The principle of a dual-flexing beam is followed, so that depending on the cross section of the reinforcing element and the movement of the clips, the corresponding resilience can be defined.

SHORT DESCRIPTION OF DRAWINGS

DESCRIPTION OF PREFERRED EMBODIMENTS

The invention will now be explained with the examples in the enclosed drawings. But the embodiments are only examples, which should not limit the inventive concept to a certain physical arrangement.

Figure 1:
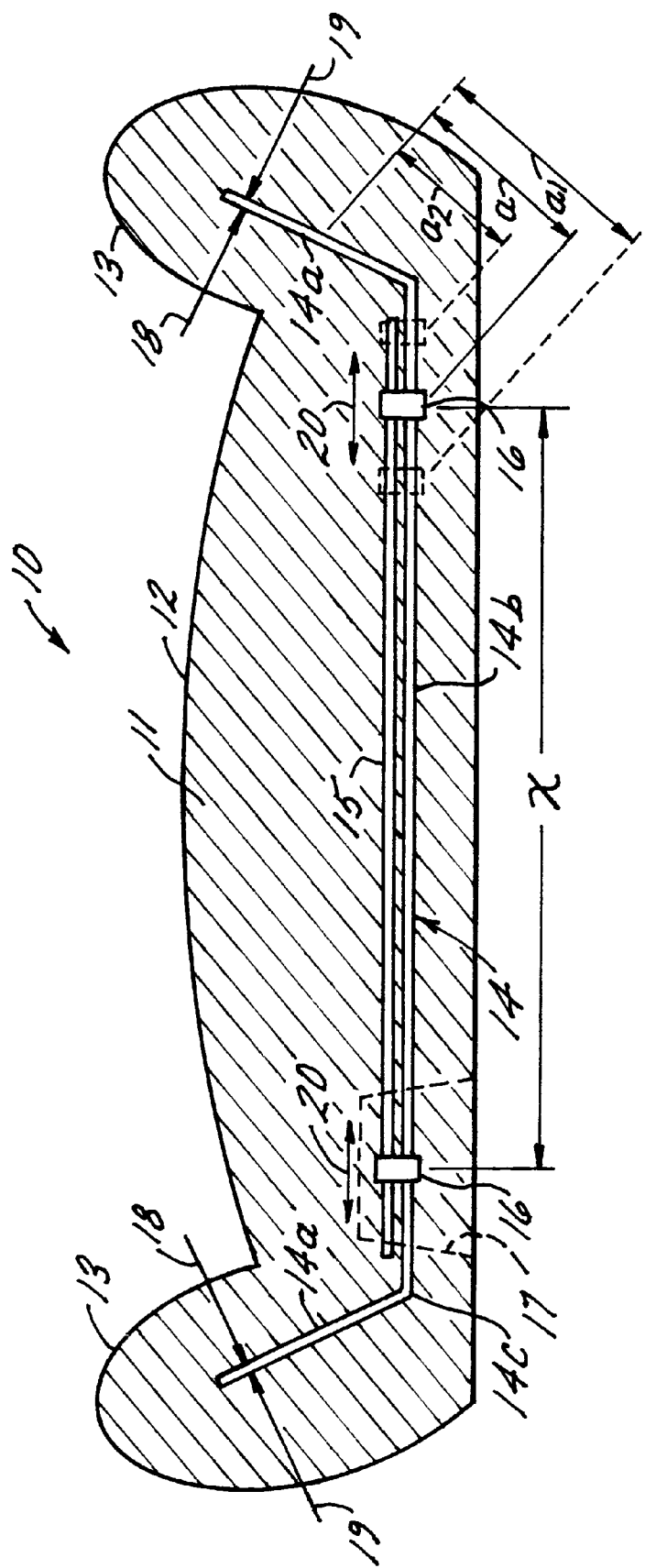
FIG. 1 shows a section through the seating surface of the motor vehicle seat.

According to FIG. 1, a seat, which can be a motor vehicle seat 10, but also any other seat, has a seating surface 12 with upholstery 11. The upholstery is supplemented on the sides by side cushions 13, which support the user laterally. In the seat itself, there is a frame 14 that stabilizes the seat and whose lateral parts 14a run into the side cushions 13. This frame, which also has transverse parts 14b connecting the side parts 14a, is a steel band frame, but it can also be made of other materials, such as plastics or fiber-reinforced plastics that have the corresponding elastic properties.

An additional reinforcing element 15 can be attached to at least one of the transverse parts 14b, preferably on the transverse part adjoining the front edge of the seat. This reinforcing element 15 reinforces at least the middle area of the transverse part 14b and for that purpose can be attached to the transverse part by at least two connectors 16 that can move along the transverse part 14b. This form of embodiment produces a dual flexing beam in the middle area, so that when there is lateral stress 18 on it, the resilience 19 can counter it and keep the seat in its original shape.

The right side of FIG. 1 shows that the connector 16 can run along the transverse part 14b in other positions, shown in dashes, in the direction of arrow 20. Here, the distance x between the two connectors changes, which influences the stiffness and the resilience 19 of the side cushions 13. While distance is x, lever arm a acts as the lever arm of the resilient force; this lever arm becomes larger than lever arm a1 and hence the stiffness of the side cushion 13 becomes smaller if connector 16 is pushed to the left into the position in dashes; and the smaller lever arm a2 becomes the lever arm if connector 16 is pushed to the right into the position in dashes; this causes an increase in stiffness.

The clipped-on reinforcing element, which can be a wire or any kind of section for example and is made of plastic or metal, causes a definable resilience that can be measured when there is lateral stress, depending on the diameter of the wire and the movement of the clips. By using various hardened and tempered spring steel bands and various wire diameters, the frame can be varied, so that dimensioning to a wide variety of stresses and resiliences is possible. If necessary, it is even possible to adjust the resilience to the user's body weight. For this purpose, the connector 16 must then, however, be arranged in a recess 17 of the upholstery 11, which is shown in FIG. 1 on the left side in dashes. In this case, the factory or the vehicle user himself can then move the clips as needed to adjust them to the body weight. But normally the frame 14 is foamed into the upholstery 11 along with the reinforcing element and connectors.

Figure 2:
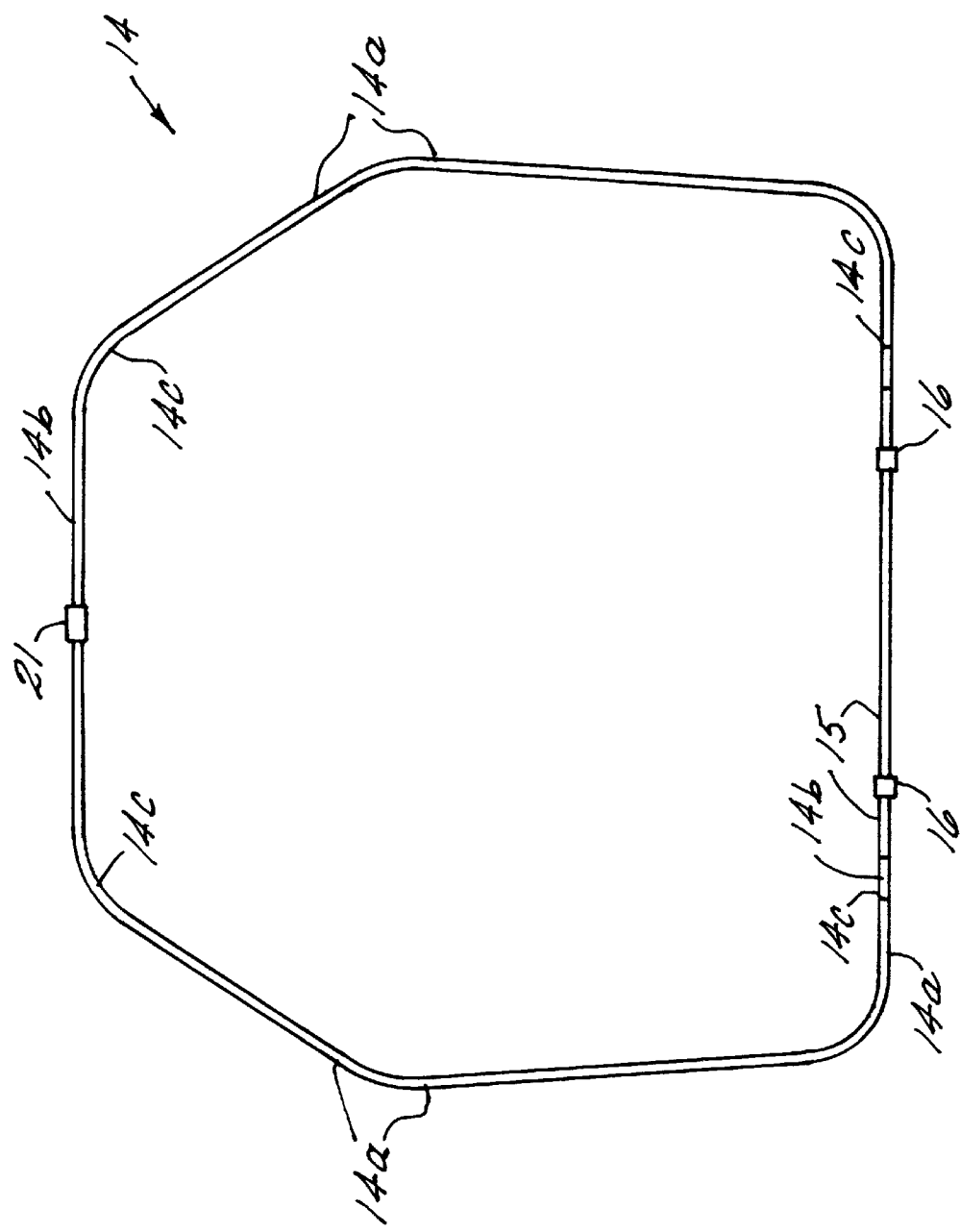
FIG. 2 shows a top view onto the frame.

FIG. 2 shows the design of the frame. In this case, the frame is made of a steel band, which is closed in a frame by connectors 21. In front, the reinforcing element 15 is placed on the frame with connectors 16. The frame has transverse parts 14b on one side that go through the flexing area 14c into the side parts 14a.

Obviously, this description can be subject to a wide variety of modifications, changes and adjustments, which fall into the area of equivalents to the dependent claims.

We claim:

1. A seat including a seating surface having upholstery, comprising:
    side cushions for supporting a user laterally;
    a frame for stabilizing said seat, said frame having side parts which extend into said side cushions, and wherein said frame further includes:
    at least one transverse part connecting said side parts of said frame;
    an additional reinforcing element reinforcing at least a middle part of said transverse part; and
    at least two connectors for attaching said additional reinforcing element to said at least one transverse part of said frame, the at least two connectors disposed between the side parts of the frame, said at least two connectors moving along said reinforcement element as well as said at least one transverse part so as to vary the spacing therebetween, the movement of the at least two connectors along the at least one transverse part for influencing stiffness and resilience of the side cushion.

2. The seat as set forth in claim 1, said at least two connectors comprise clamps having a predetermined distance between said at least two connectors, whereby as said predetermined distance increases, stiffness and resilience of said side cushions increases.

3. The seat as set forth in claim 1, wherein said at least two connectors are arranged to be accessible and movable in recesses in said upholstery.

4. The seat as set forth in claim 1, wherein said frame with said at least one transverse part and said side parts comprises:

a steel band frame at least partially foamed into said seat.

5. The seat as set forth in claim 1, wherein said reinforcing element is attached to said at least one transverse part adjoining a front edge of said seat.

* * * * *